United States Patent
Pettigrew

(10) Patent No.: US 7,315,646 B2
(45) Date of Patent: Jan. 1, 2008

(54) DEGRAINING IMAGE DATA

(75) Inventor: Daniel Pettigrew, Pacific Palisades, CA (US)

(73) Assignee: Autodesk Canada Co., Montreal, Quebec (CA)

(*) Notice: Subject to any disclaimer, the term of this patent is extended or adjusted under 35 U.S.C. 154(b) by 645 days.

(21) Appl. No.: 10/818,121

(22) Filed: Apr. 5, 2004

(65) Prior Publication Data

US 2004/0264766 A1    Dec. 30, 2004

(30) Foreign Application Priority Data

Apr. 5, 2003    (GB) ................. 0307912.6

(51) Int. Cl.
*G06T 5/00*    (2006.01)
(52) U.S. Cl. ...................... 382/173; 382/275
(58) Field of Classification Search ............. None
See application file for complete search history.

(56) References Cited

FOREIGN PATENT DOCUMENTS

| EP | 1174824 A2 | 1/2002 |
|---|---|---|
| EP | 1174824 A3 | 1/2003 |
| JP | 9114975 | 10/1995 |
| WO | WO 9811510 A1 * | 3/1998 |
| WO | WO 00/46749 | 8/2000 |

OTHER PUBLICATIONS

JP 09-114975 A (1997) Human assisted machine translation.*

* cited by examiner

*Primary Examiner*—Brian P. Werner
*Assistant Examiner*—Thomas M Redding
(74) *Attorney, Agent, or Firm*—Gates & Cooper LLP

(57) ABSTRACT

A method, apparatus, and article of manufacture provides the ability to process image data. Image data is output as picture screen elements to a display. In response to selecting a sample of the picture screen elements, a reference co-ordinate system is generated. The reference co-ordinate system is used to process each of the picture screen elements. An axis of the reference co-ordinate system defines a distance. The picture screen elements are discriminated and processed according to the distance by proportionally averaging the co-ordinates.

15 Claims, 14 Drawing Sheets

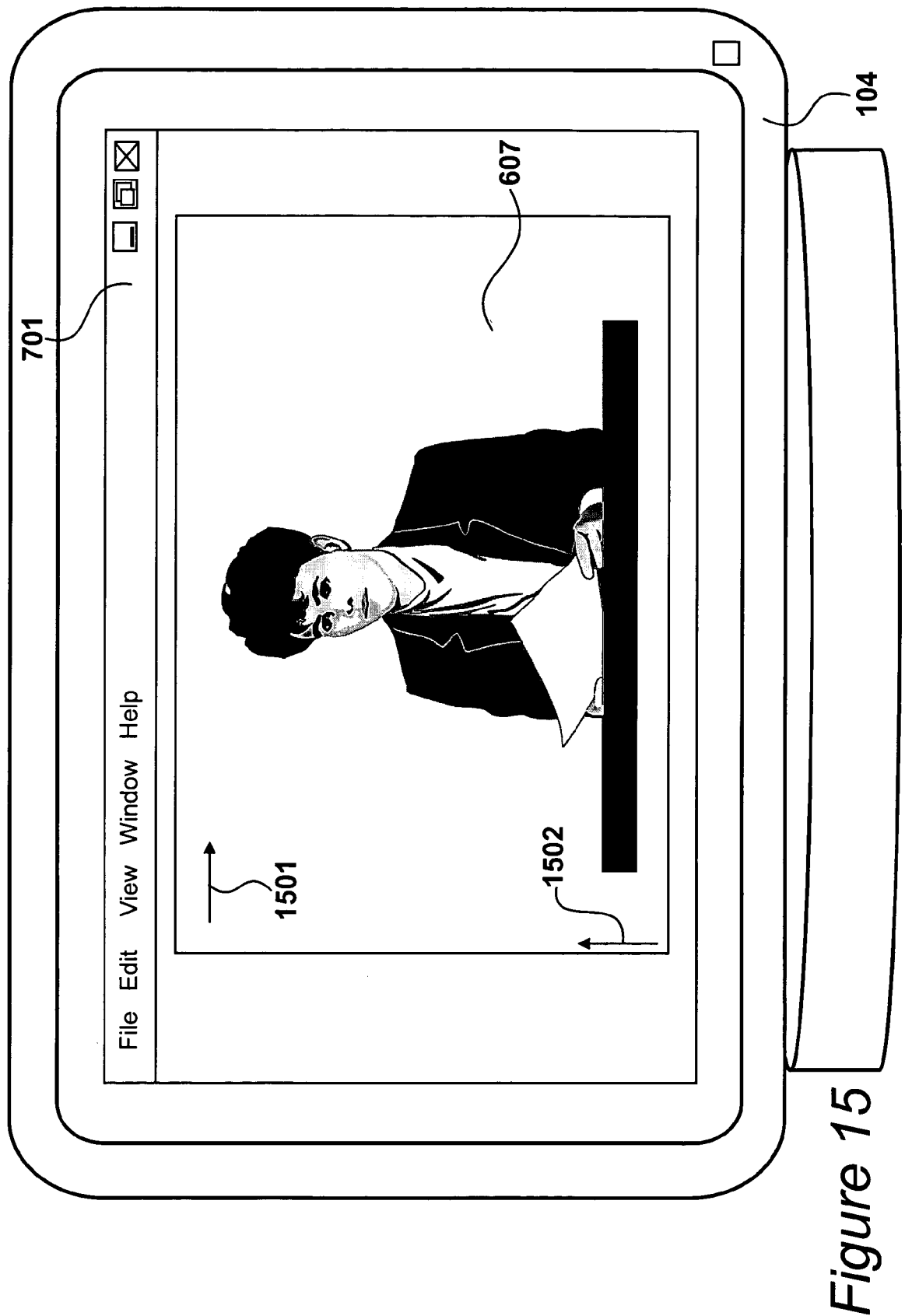

DEGRAINING IMAGE DATA

CROSS-REFERENCE TO RELATED APPLICATIONS

This application claims the benefit under 35 U.S.C. §119 of the following co-pending and commonly assigned foreign patent application, which application is incorporated by reference herein:

United Kingdom Application No. 03 07 912.6, entitled "PROCESSING IMAGE DATA", by Daniel Pettigrew, filed on Apr. 5, 2003.

This application is related to the following commonly assigned patent applications, all of which applications are incorporated by reference herein:

U.S. patent application Ser. No. 10/620,391, entitled "SELECTING FUNCTIONS VIA A GRAPHICAL USER INTERFACE", by Christopher Vienneau, Juan Pablo Di Lelle and Michiel Schriever, filed Jul. 16, 2003;

U.S. patent application Ser. No. 08/617,400, entitled "MULTITRACK ARCHITECTURE FOR COMPUTER-BASED EDITING OF MULTIMEDIA SEQUENCES", by David Hermanson, filed Mar. 18, 1996 (now U.S. Pat. No. 5,892,506 issued Apr. 6, 1999);

U.S. patent application Ser. No. 08/630,131, entitled "PROCESSING IMAGE DATA", by Benoit Sevigny, filed Apr. 10, 1996 (now U.S. Pat. No. 5,786,824 issued Jul. 28, 1998); and U.S. patent application Ser. No. 08/827,641, entitled "METHOD AND APPARATUS FOR COMPOSITING IMAGES", by Benoit Sevigny, filed Apr. 9, 1997 (now U.S. Pat. No. 6,269,180 issued Jul. 31, 2001).

FIELD OF THE INVENTION

The present invention relates to processing image data. More particularly, the present invention relates to an apparatus for removing grain from image frames and a method thereof.

DESCRIPTION OF THE RELATED ART

Systems for processing image data, having a processing unit, storage devices, a display device and manually operable input device (such as a stylus and touchtablet combination) are shown in U.S. Pat. Nos. 5,892,506; 5,786,824 and 6,269,180 all assigned to the present Assignee. In these aforesaid systems, it is possible to perform many functions upon stored image data in response to an operator manually selecting a function from a function menu.

Recently, in such systems as "TOXIC", "FIRE" and "INFERNO", licensed by the present Assignee, the number of functions that may be performed has increased significantly. Thus, for example, there has been a tendency towards providing functions for special effects, compositing and editing on the same processing system.

In order to facilitate the integration of such special effects into video or movie frames and, further, facilitate the compositing thereof which traditionally involves merging said edited frames into a final output sequence of image frames, the use of blue screen in video environments and green screen in cinematographic environments respectively has similarly increased. Indeed, filming talent or objects against a blue or green highly-saturated background simplifies the integration of said talent or objects into an alternative frame by removing said background with a process known to those skilled in the art as keying.

However, problems arise in the form of undesirable image artifacts when performing keying upon frames having excess frequency variations in any given color, known to those skilled in the art as grain. Grain may arise from many different situations, such as filming image frames on defective coarse film stock, wherein said variations are digitized therewith, or digitizing errors occurring when said image frames are digitized to perform said effects thereon. In effect, some pixels of the digitized frame depicting a uniform background or even the talent have respective red, green and blue color component values which differ markedly from neighboring pixels and, when processed for keying in or out, such differences are carried through and possibly amplified.

Numerous techniques are known to those skilled in the art in order to attenuate such variations and are traditionally referred to as grain-removal techniques. However, said techniques of the prior art feature the distinct disadvantage that they either do not remove the grain from the entire frame or they remove grain from the entire frame by indiscriminately blurring every pixel thereof. For instance, indiscriminately processing a portion of an image frame having close high- and low-frequency pixels results in averaged pixels wherein the distinctions between high-frequency pixels to be keyed in and low-frequency pixels to be keyed out is lost, resulting in image artifacts.

What is therefore required is an averaging technique wherein said blurring is performed with discriminating frequencies of close pixels, in order to maintain the definition of the edges such high-frequency pixels define.

BRIEF SUMMARY OF THE INVENTION

According to a first aspect of the present invention, there is provided an apparatus for processing image data, comprising processing means, memory means, display means and manually operable input means, wherein said memory means stores said image data and instructions, said image data and said instructions configure said processing means to output said image data as picture screen elements to said display means. In response to selecting a sample of said picture screen elements by means of said input means, said processing means is further configured to generate a reference co-ordinate system within which to process each of said picture screen elements, an axis thereof defining a distance; said processing means is further configured to discriminating said picture screen elements and process said discriminated picture screen elements according to said distance by means of proportionally averaging the co-ordinates thereof.

According to another aspect of the present invention, there is provided a method of processing image data, said method comprising the steps of outputting image data as picture screen elements to display means; selecting a sample of said picture screen elements by means of manually-operable input means; generating a reference co-ordinate system within which to process each of said picture screen elements, an axis thereof defining a distance; discriminating said picture screen elements and processing said discriminated picture screen elements according to said distance by means of proportionally averaging the co-ordinates thereof.

According to yet another aspect of the present invention, there is provided a computer-readable medium having computer-readable instructions for processing image data executable by a computer such that, when executing said instructions, said computer will perform the steps of outputting said image data as picture screen elements to display means; in response to selecting a sample of said picture screen elements by means of manually-operable input means, generating a reference co-ordinate system within which to process each of said picture screen elements, an axis thereof defining a distance; discriminating said picture screen elements and processing said discriminated picture screen elements according to said distance by means of proportionally averaging the co-ordinates thereof.

BRIEF DESCRIPTION OF THE SEVERAL VIEWS OF THE DRAWINGS

FIG. 15 shows the graphical user interface shown in FIG. 14, wherein grain is removed from the image data according to the present invention.

WRITTEN DESCRIPTION OF THE BEST MODE FOR CARRYING OUT THE INVENTION

FIG. 1

Figure 1:
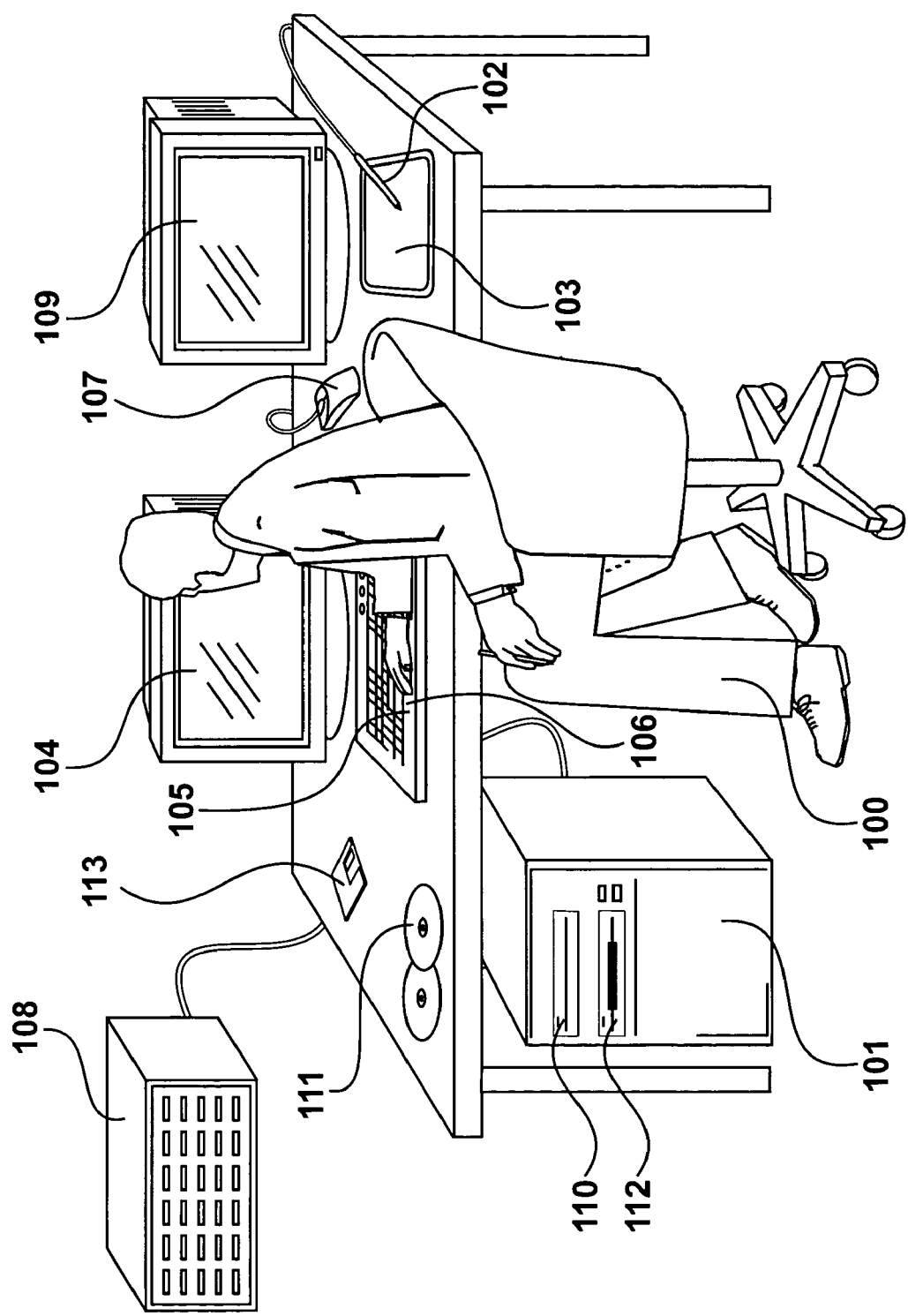
FIG. 1 shows a system for processing image data that embodies the present invention.

A computer editing system, including a computer system video display unit and a high-resolution monitor, is shown in FIG. 1.

In the system shown in FIG. 1, instructions are executed upon a graphics workstation operated by an artist 100, the architecture and components of which depends upon the level of processing required and the size of images being considered. Examples of graphics-based processing systems that may be used for very-high-resolution work include an ONYX II manufactured by Silicon Graphics Inc, or a multiprocessor workstation 101 manufactured by IBM Inc. The processing system 101 receives instructions from an artist by means of a stylus 102 applied to a touch tablet 103, in response to visual information received by means of a visual display unit 104. The visual display unit 104 displays images, menus and a cursor and movement of said cursor is controlled in response to manual operation of a stylus 102 upon a touch table 103. Keyboard 105 is of a standard alpha numeric layout and includes a spacebar 106. Manual operation of the spacebar 106 provides a first input command in a preferred embodiment resulting in a multilateral device being displayed at the cursor position, wherein said multilateral device identifies a function type at each of its sections, each having an associated displayable menu. Reference may be made to U.S. patent application Ser. No. 10/620,391 for a definition of said multilateral device, the teachings of which are incorporated herein by reference.

In response to a second input command, preferably received from the stylus 102, the cursor is moved over one of the edges of the displayed multilateral device. Thereafter, having moved the cursor over an edge of the multilateral device, the aforesaid menu associated with the edge over which the cursor has been moved is displayed. In this way, a user is given rapid access to a menu of interest without said menu being continually displayed over the working area of the VDU 104.

In addition, data may be supplied by said artist 100 via a mouse 107, with input source material being received via a real-time digital video recorder or similar equipment configured to supply high-bandwidth frame data.

The processing system 101 includes internal volatile memory in addition to bulk, randomly-accessible storage, which is provided by means of a RAID disk array 108. Output material may also be viewed by means of a high-quality broadcast monitor 109. System 101 includes an optical data-carrying medium reader 110 to allow executable instructions to be read from a removable data-carrying medium in the form of an optical disk 111, for instance a DVD-ROM. In this way, executable instructions are installed on the computer system for subsequent execution by the system. System 101 also includes a magnetic data-carrying medium reader 112 to allow object properties and data to be written to or read from a removable data-carrying medium in the form of a magnetic disk 113, for instance a floppy-disk or a ZIP™ disk.

FIG. 2

Figure 2:
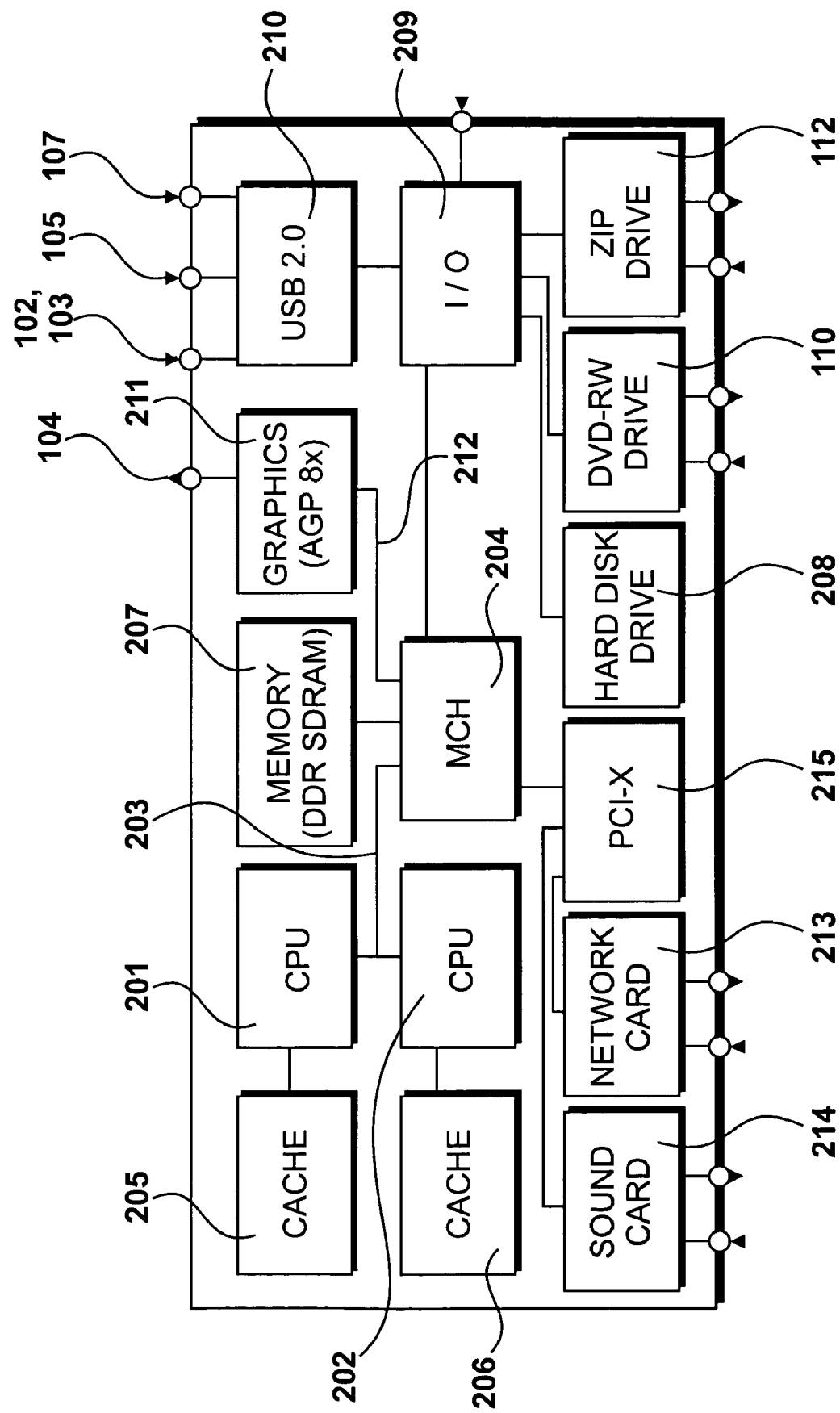
FIG. 2 details the hardware components of the computer system shown in FIG. 1, including a memory.

The components of computer system 101 are further detailed in FIG. 2 and, in the preferred embodiment of the present invention, said components are based upon Intel® E7505 hub-based Chipset.

The system includes two Intel® Pentium™ Xeon™ DP central processing units (CPU) 201, 202 running at three Gigahertz, which fetch and execute instructions and manipulate data with using Intel®'s Hyper Threading Technology via an Intel® E7505 533 Megahertz system bus 203 providing connectivity with a Memory Controller Hub (MCH) 204. CPUs 201, 202 are configured with respective high-speed caches 205, 206 comprising at least five hundred and twelve kilobytes, which store frequently-accessed instructions and data to reduce fetching operations from a larger memory 207 via MCH 204. The MCH 204 thus co-ordinates data flow with a larger, dual-channel double-data rate main memory 207, which is between two and four gigabytes in data storage capacity and stores executable programs which, along with data, are received via said bus 203 from a hard disk drive 208 providing non-volatile bulk storage of instructions and data via an Input/Output Controller Hub (ICH) 209. Said ICH 209 similarly provides connectivity to DVD-ROM re-writer 110 and ZIP™ drive 112, both of which read and write data and instructions from and to removable data storage media. Finally, ICH 209 provides connectivity to USB 2.0 input/output sockets 210, to which the stylus 102 and tablet 103 combination, keyboard 105 and mouse 107 are connected, all of which send user input data to system 101.

A graphics card 211 receives graphics data from CPUs 201, 202 along with graphics instructions via MCH 204. Said graphics accelerator 211 is preferably coupled to the MCH 204 by means of a direct port 212, such as the direct-attached advanced graphics port 8X (AGP 8X) promulgated by the Intel® Corporation, the bandwidth of which exceeds the bandwidth of bus 203. Preferably, the graphics card 211 includes substantial dedicated graphical processing capabilities, so that the CPUs 201, 202 are not burdened with computationally intensive tasks for which they are not optimized.

Network card 213 provides connectivity to the framestore 108 by processing a plurality of communication protocols, for instance a communication protocol suitable to encode and send and/or receive and decode packets of data over a Gigabit-Ethernet local area network. A sound card 214 is provided which receives sound data from the CPUs 201, 202 along with sound processing instructions, in a manner similar to graphics card 211. Preferably, the sound card 214 includes substantial dedicated digital sound processing capabilities, so that the CPUs 201, 202 are not burdened with computationally intensive tasks for which they are not optimized. Preferably, network card 213 and sound card 214 exchange data with CPUs 201, 202 over system bus 203 by means of Intel®'s PCI-X controller hub 215 administered by MCH 204.

The equipment shown in FIG. 2 constitutes a typical workstation comparable to a high-end IBM™ PC compatible or Apple™ Macintosh.

FIG. 3

Figure 3:
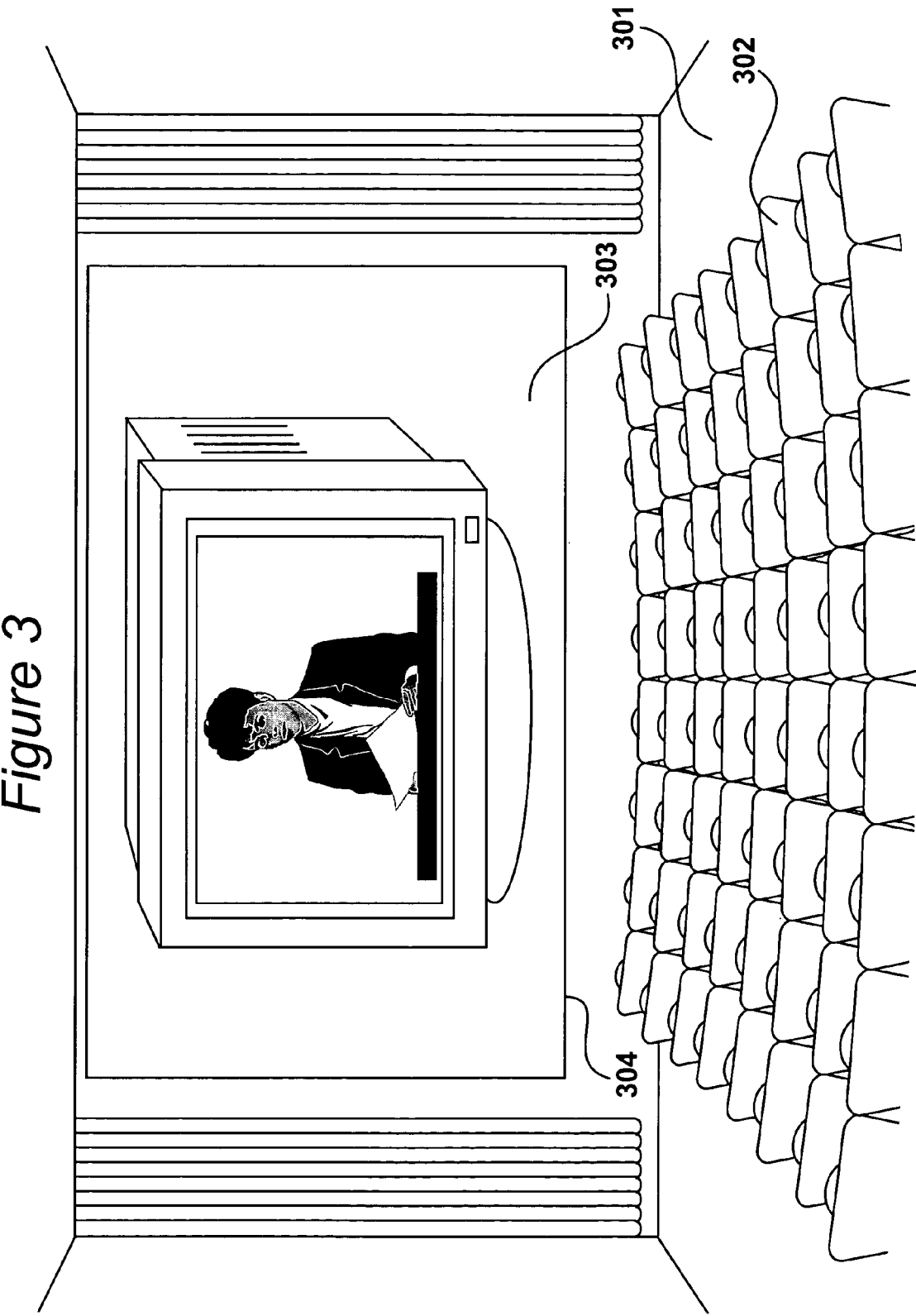
FIG. 3 illustrates a scene shown in a movie theatre comprising image data processed by the system shown in FIGS. 1 and 2.

A conventional movie theatre 301 is shown in FIG. 3, in which an audience 302 is watching a scene 303 projected onto a movie screen 304. Scene 303 comprises a sequence of many thousands of high-definition image frames exposed on film stock, thus having a very high resolution necessary to realistically portray the contents thereof when magnified by the projector onto screen 304, having regard to the amount of detail observable by audience 302 therein.

As was detailed in the introduction above, it is known to digitize source image frames contributing to the sequence 303 for the purpose of post-production editing and the implementation of image enhancements. In modern image-processing systems, such high-definition images comprise possibly hundreds of different screen elements, which may be understood as the total number of processing functions to be performed upon the original image frame digitized from film. Editing these image frames therefore potentially involve editing the criteria according to which each of said functions processes said original frame. In order to facilitate said editing and enhancements, various image data processing techniques have been developed to improve the interaction of an image editor such as artist 100 therewith, and the workflow thereof. Specifically, one such technique involves the referencing of said digitized image frames and the various post-production processes applied thereto within a hierarchical data processing structure, also known as a process tree or scene graph, whereby said image editor may intuitively and very precisely edit any component or object of any digitized image frame referenced therein.

FIG. 4

Figure 4:
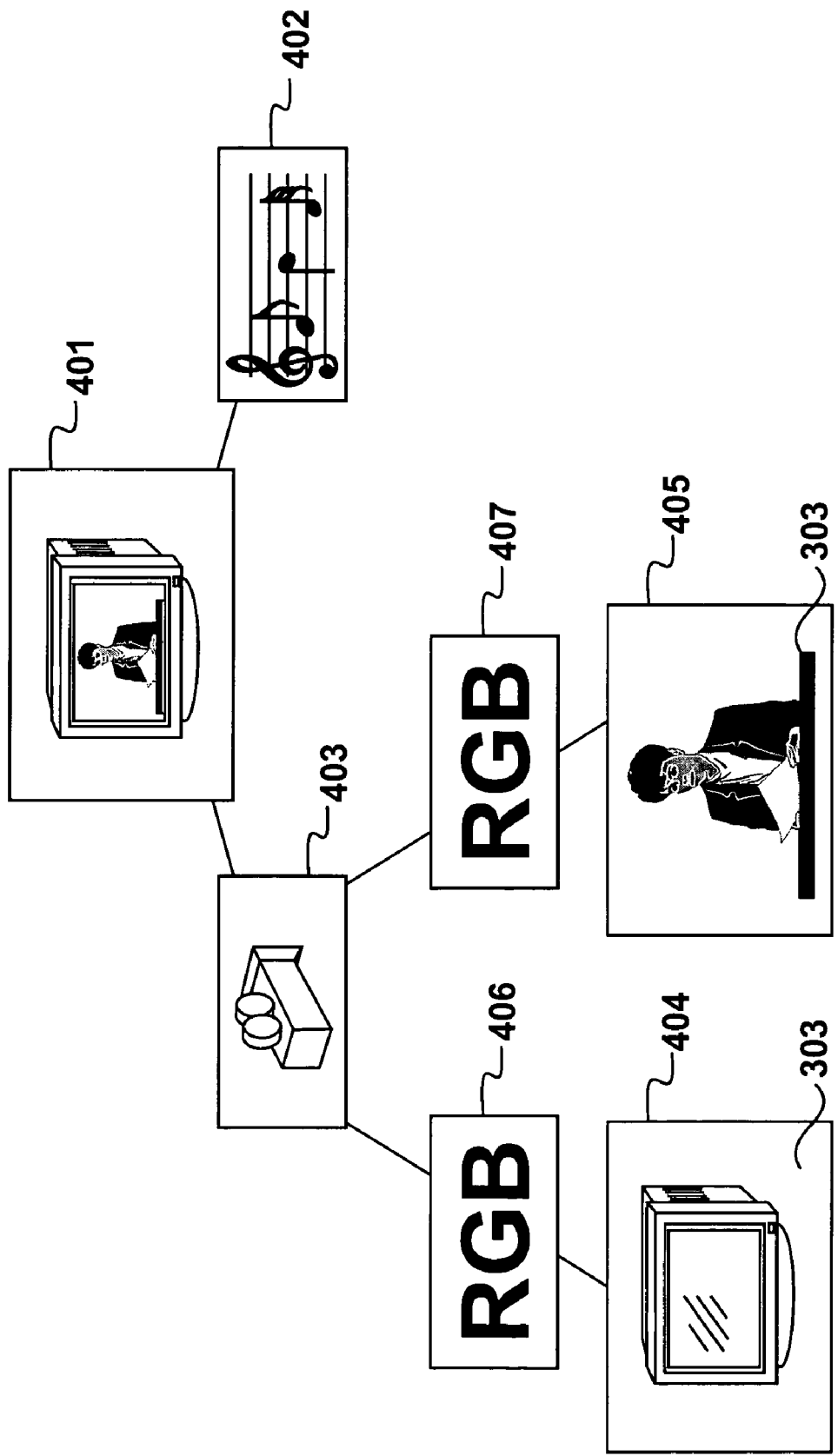
FIG. 4 further illustrates the image data and structure thereof shown in FIG. 3.

A simplified example of the process tree of sequence 303 is shown in FIG. 4.

In compositing applications processed by the processing system shown in FIGS. 1 and 2, the scene graph of sequence 303 is traditionally represented as a top-down tree structure, wherein the topmost node 401 pulls all the data output by nodes depending therefrom in order to output final output data, some of which will be image data and some of which may be audio data, for instance generated by a first audio child node 402.

In order to generate image data by way of image rendering, a fundamental requirement is the definition of a rendering camera and its view frustrum, as defined by a rendering node 403. In the example, said final output image frame is a composited image frame which includes a background image frame depicting a TV set and a foreground image frame depicting a TV presenter to be keyed therewith. Consequently, the TV background image frame is output by a frame node 404 and the presenter foreground image frame is output by a frame node 405, wherein said frame nodes are children of rendering node 403.

If the R,G,B color component values of both the background and foreground image frames require correction independently of one another before said final frame is rendered, color-correction nodes 406, 407 may be added as respective parent nodes of frame nodes 404, 405, wherein said nodes 406, 407 respectively pull the image data output by frame nodes 404, 405 in order to process it and effect said correction before rendering node 403 can render said color-corrected final output frame.

The scene graph shown in FIG. 4 is very small and restricted for the purpose of not obscuring the present description unnecessarily but it will be readily apparent to those skilled in the art that such scene graphs usually involve hundreds or even thousands of such hierarchical data processing nodes.

FIG. 5

Figure 5:
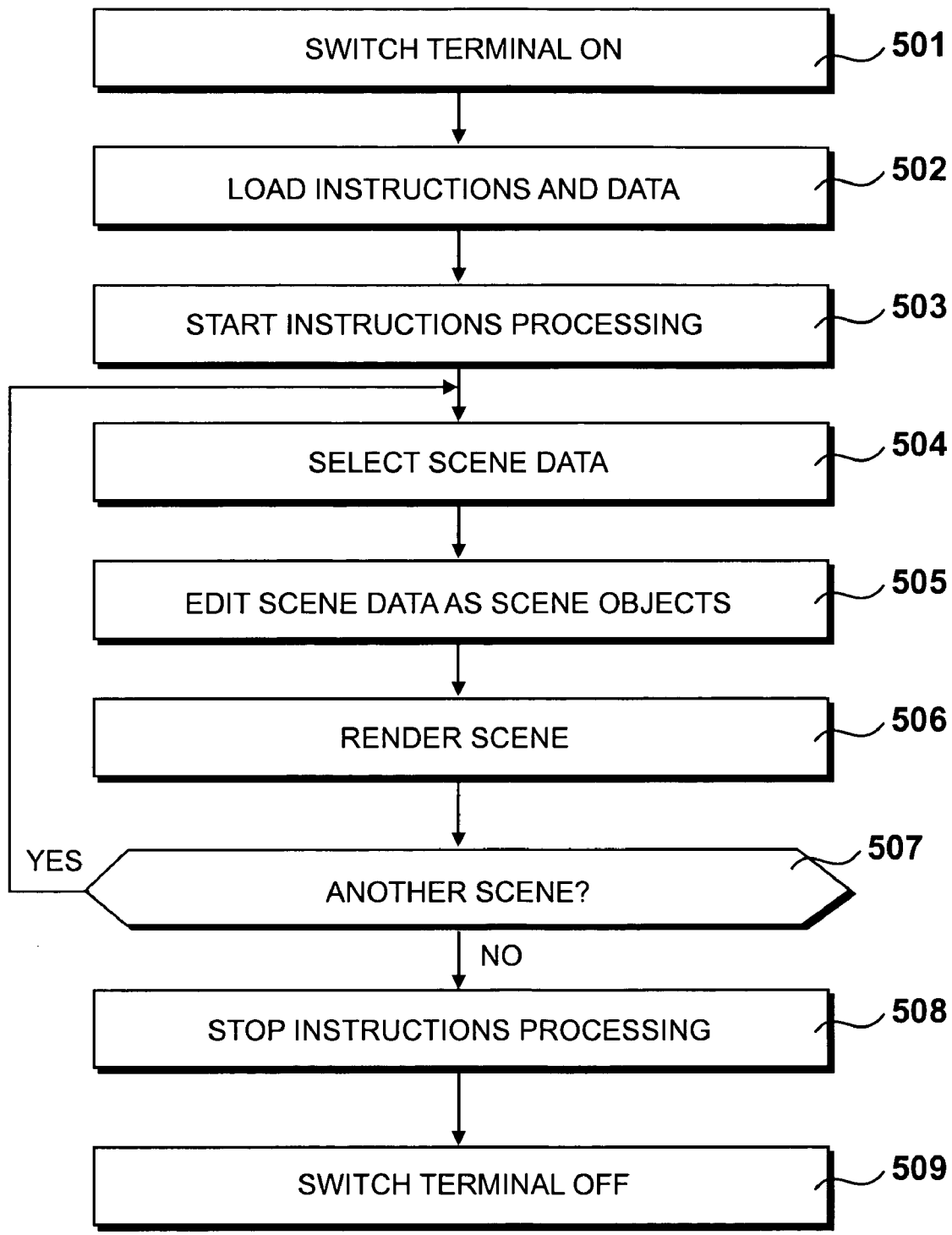
FIG. 5 details the processing steps according to which an image editor operates the image processing system shown in FIGS. 1 and 2 according to the present invention, including a step of editing image data shown in FIGS. 3 and 4.

The processing steps according to which artist 100 may operate the image processing system shown in FIGS. 1 and 2 according to the present invention are described in FIG. 5.

At step 501, artist 100 switches on the image processing system and, at step 502, an instruction set is loaded from hard disk drive 208, DVD ROM 111 by means of the optical reading device 110 or magnetic disk 113 by means of magnetic reading device 112, or even a network server accessed by means of network card 213.

Upon completing the loading of step 502 of instructions set into memory 207, CPUs 201, 202 may start processing said set of instructions, also known as an application, at step 503. User 100 may then select a scene graph such as described in FIG. 4 at step 504. Upon performing the selection of step 504, artist 100 may now perform a variety of processing functions upon the image data of the scene graph at step 505, whereby a final composite image frame may then output at step 506 by means of rendering the edited scene.

At step 507, a question is asked as to whether the image data of another scene requires editing at step 505 and rendering at step 506. If the question of step 507 is answered positively, control is returned to step 504, whereby another scene may then be selected. Alternatively, if the question of 507 is answered negatively, signifying that artist 100 does not require the functionality of the application loaded at step 502 anymore and can therefore terminate the processing thereof at step 508. Artist 100 is then at liberty to switch off the image processing system 101 at step 509.

FIG. 6

Figure 6:
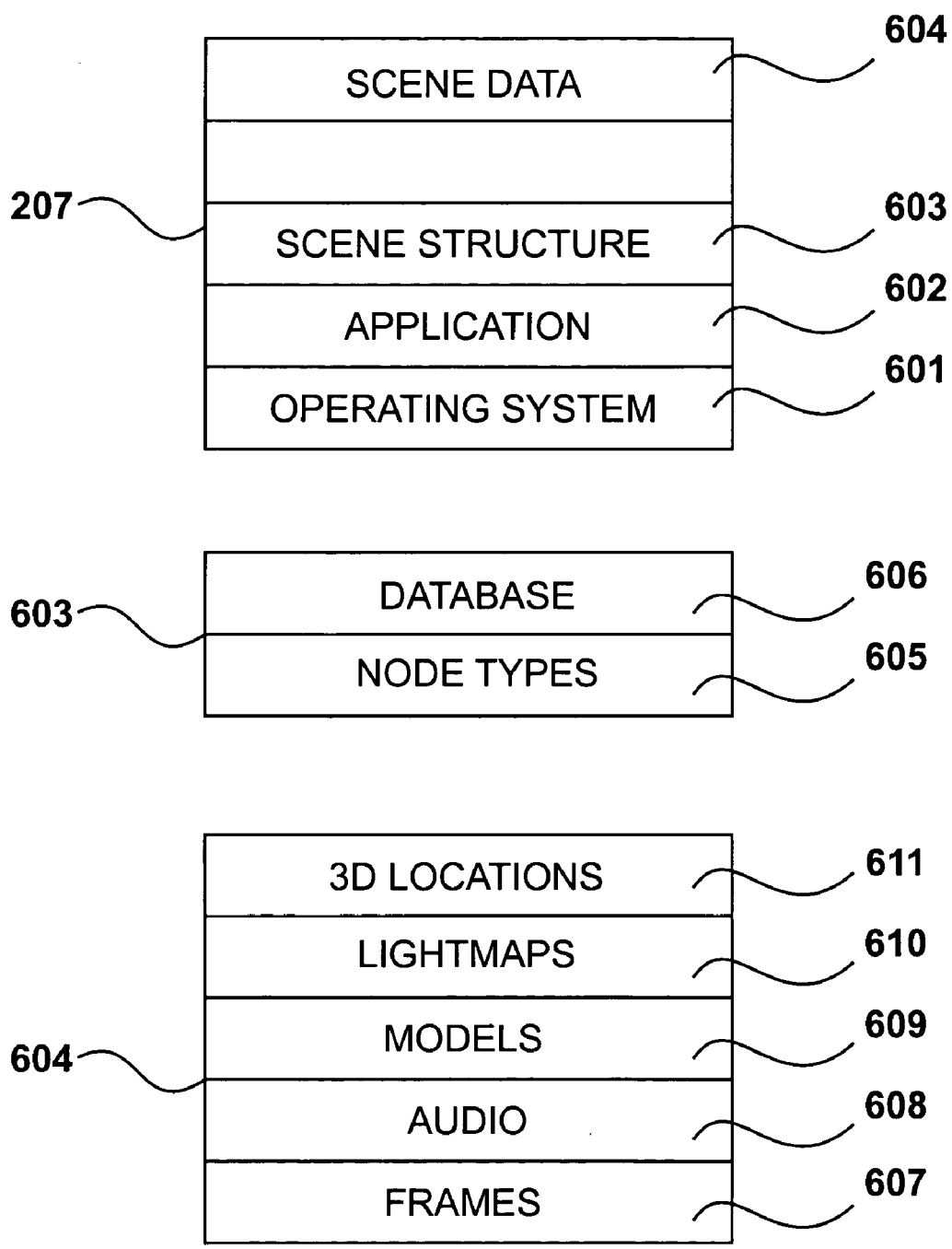
FIG. 6 details the contents of the memory shown in FIG. 2 after performing the step of starting the processing of an application shown in FIG. 5, including said application.

The contents of main memory 207 subsequently to the selection step 504 of a scene are further detailed in FIG. 6.

An operating system is shown at 601 which comprises a reduced set of instructions for CPUs 201, 202 the purpose of which is to provide image processing system 101 with basic functionality. Examples of basic functions include for instance access to files stored on hard disk drive 208 or DVD/CD-ROM 111 or ZIP(tm) disk 113 and management thereof, network connectivity with a network server and frame store 108, interpretation and processing of the input from keyboard 105, mouse 107 or graphic tablet 102, 103. In the example, the operating system is Windows XP(tm) provided by the Microsoft corporation of Redmond, Calif., but it will be apparent to those skilled in the art that the instructions according to the present invention may be easily adapted to function under different other known operating systems, such as IRIX(tm) provided by Silicon Graphics Inc or LINUX, which is freely distributed.

An application is shown at 602 which comprises the instructions loaded at step 502 that enable the image processing system 101 to perform steps 503 to 507 according to the invention within a specific graphical user interface displayed on VDU 104. Application data is shown at 603 and 604 and comprises various sets of user input-dependent data and user input-independent data according to which the application shown at 602 processes image data. Said application data primarily includes a data structure 603, which references the entire processing history of the image data as loaded at step 504 and will hereinafter be referred to as a scene graph or scene structure. According to the present invention, scene structure 603 includes a scene hierarchy which comprehensively defines the dependencies between each component within an image frame as hierarchically-structured data processing nodes, as will be further described below.

Scene structure 603 comprises a plurality of node types 605, each of which provides a specific functionality in the overall task of rendering a scene according to step 506. Said node types 605 are structured according to a hierarchy 606, which may preferably but not necessarily take the form of a database, the purpose of which is to reference the order in which various node types 605 process scene data 604.

Further to the scene structure 603, application data also includes scene data 604 to be processed according to the above hierarchy 606 in order to generate one or a plurality of image frames, i.e. the parameters and data which, when processed by their respective data processing nodes, generate the various components of a final composite image frame.

A number of examples of scene data 604 are provided for illustrative purposes only and it will be readily apparent to those skilled in the art that the subset described is here limited only for the purpose of clarity. Said scene data 604 may include image frames 607 acquired from framestore 108, for instance a background image frame digitized from film and subsequently stored in frame store 108, portraying a TV set and a foreground image frame digitized from film and subsequently stored in frame store 108, portraying a TV presenter.

Said scene data 604 may also include audio files 608 such as musical score or voice acting for the scene structure selected at step 504. Said scene data 604 may also include pre-designed three-dimensional models 609, such as a camera object required to represent the pose of the rendering origin and frustrum of a rendering node within the compositing environment, which will be described further below in the present description. In the example, scene data 604 includes lightmaps 610, the purpose of which is to reduce the computational overhead of CPUs 201, 202 when rendering the scene with artificial light sources. Scene data 604 finally include three-dimensional location references 611, the purpose of which is to reference the position of the scene objects edited at step 505 within the three-dimensional volume of the scene compositing environment.

FIG. 7

Figure 7:
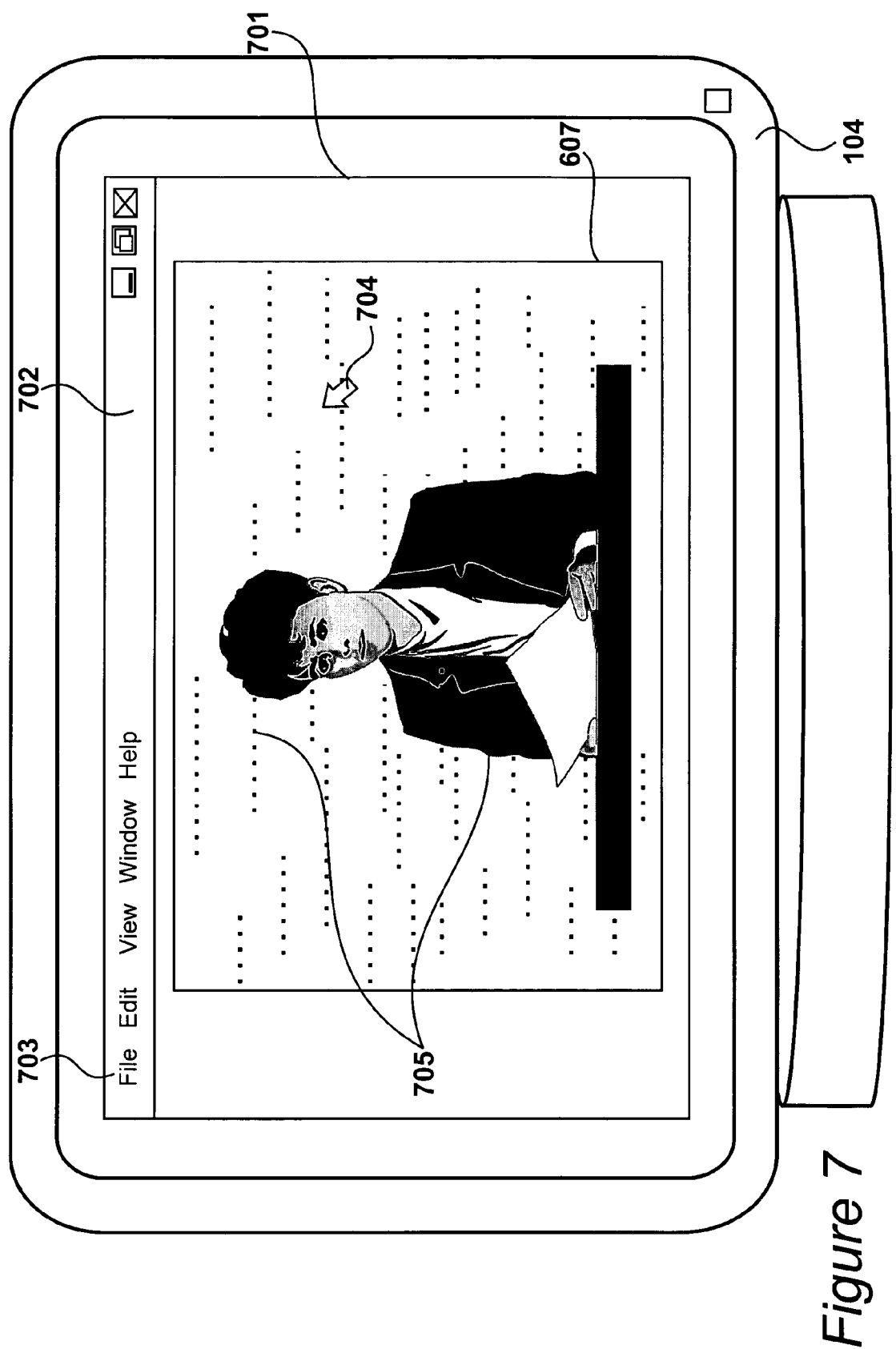
FIG. 7 shows the default graphical user interface of the application shown in FIG. 6.

The default graphical user interface of application 602 output to display 104 upon completing the application loading and starting steps 502 and 503 and the image data selection of step 504 is shown in FIG. 7.

According to the present invention, the image data shown in FIGS. 3 to 6 may be edited by an image editor with image processing application 602 processed by image processing system 101. Upon completing loading and starting steps 502, 503, said system 101 outputs a default graphical user interface (GUI) 701 of the image processing application 602 to display means 104 for interaction by said user therewith, within which representations of image-processing functions are displayed for selection and are alternatively named menus, icons and/or widgets by those skilled in the art.

GUI 701 firstly comprises a conventional menu toolbar 702, having a plurality of function representations thereon. A first representation 703 defines a "File" management menu which, when selected by artist 100 by means of positioning a GUI pointer 704 thereon with translating mouse 107 or stylus 102 over tablet 103 and subsequently effecting a mouse click or tapping said stylus 102 over said tablet 103, generates a conventional "drop-down" sub-menu (not shown) configured with further representations of file management functions, such as an "open file" function for instance. In the example, user 100 performs the above interaction in order to select image data at step 504 as a foreground "TV presenter" image frame respectively output by frame node 405, which is then accessed at framestore 108 and stored in memory 207 as image data 607.

In the example, the image frame portraying the TV presenter was recorded under adverse lighting conditions, or the digitization thereof resulted in a number of artifacts generated within the output digitized image frame, or the film comprising said image frame that was exposed to record said TV presenter was particularly coarse. Irrespective of which particular situation of the three situations described above, image data 607 comprises a substantial amount of grain 705, which should preferably be removed from said image data 607, prior to compositing the "TV presenter" image frame with a background "TV set" image frame. Indeed, the keying of said grainy foreground frame with a background frame would invariably result in an output composite frame having undesirable artifacts therein, because the grain 705 would be observable therein, since keying essentially involves performing simple arithmetic upon the respective red, green, blue and alpha color component values of a foreground pixel and a background pixel having the same letters X, Y co-ordinates in relation to the two-dimensional surface of said output composite frame.

FIG. 8

As was described in the introduction, numerous image processing techniques are known with which to remove grain 705 of image data 607 prior to performing said keying. A first grain removal technique is described in FIG. 8.

Matte-based grain removal techniques according to the known prior art involve generating a matte 801 of image data 607, wherein the pixels of said image data 607 are processed in order to differentiate pixels 802 defining image data which will be keyed into a final output composite frame, e.g. visible in said final frame and are usually conferred a maximum matte value of one, wherein a value of one is white and a value of zero is black. Consequently, pixels of image data 607 to be keyed-out of said final frame are processed and conferred a matte value of zero, thus are black.

Depending upon the contents of image data 607, a portion of the pixels thereof may be processed and conferred a matte value lying between zero and one, signifying that such pixels should be partially-blended with the background image frame and not simply replace corresponding background image frame pixels as is the case with pixels 802. In a matte, such "partially-occluding" pixels are usually gray (lying between white and black) and are most often located along the edges of a group of "fully-occluding" pixels 802, such as hair 803.

Such matte-based grain removal techniques are very powerful to remove grain, such as grain 705, from the portion of pixels to be keyed out, shown as black pixels in matte 801, wherein said pixels most often define a conventional blue screen in video environments or green screen in cinematographic environments. Indeed, numerous matte-processing techniques are known with which to process pixel RGBA color component values of said blue or green background to be keyed out to ensure that grain 705 and/or any other such artifacts (such as hue and/or saturation imbalances resulting from inadequate lighting on the set at the time of filming) are compensated. However, the shortcoming of such matte-based grain removal techniques is that any grain 705 that is present within the image data defining the talent to be keyed in, shown as 804 in pixels portion 802, is not removed because the RGBA color component values of said pixels 802 are not similarly processed, for instance because in the actual image data 607, said pixels 802 have a very wide range of different RGBA color component values portraying a correspondingly very wide range of colors.

FIG. 9

Figure 8:
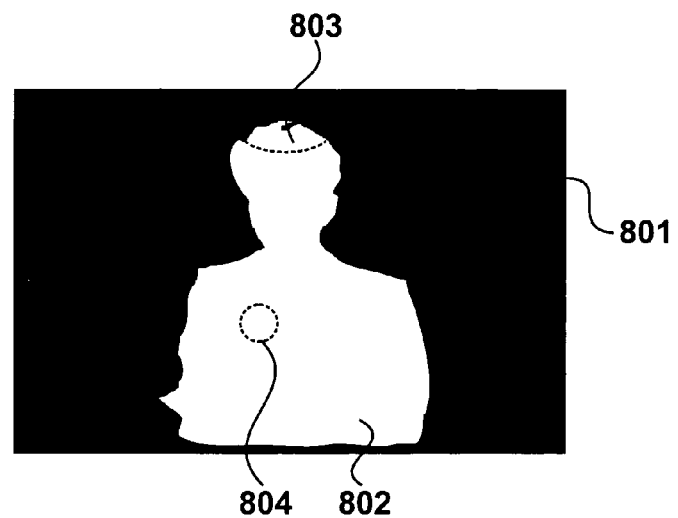
FIG. 8 illustrates a first grain removal technique according to the known prior art.
Figure 9:
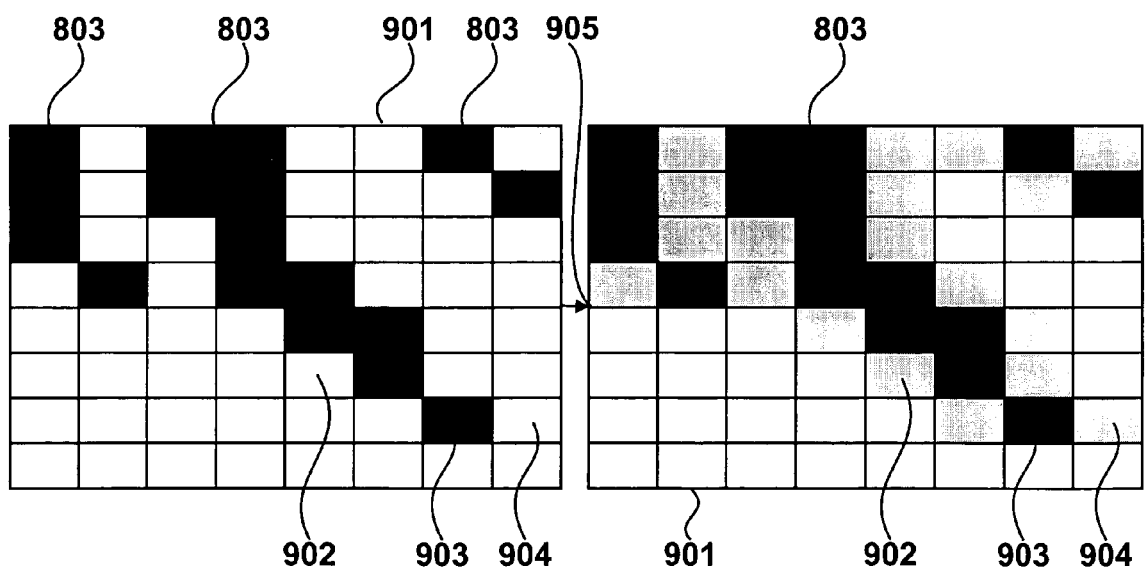
FIG. 9 illustrates another grain removal technique according to the known prior art.

In more recent image processing systems, the shortcomings of matte-based grain removal techniques described in FIG. 8 by way of unprocessed grain 804 have been addressed with alternative grain removal techniques which average said RGBA color component values in the image frame 607. Such an averaging technique according to the known prior art is illustrated in FIG. 9.

A portion of the hair 803 shown in FIG. 8 is magnified at 901, wherein individual pixels 902 are visible. Said pixels are shown with RGBA color component values, because there is no need to generate a matte 801 in order to remove grain with the averaging techniques of the prior art. Said averaging techniques traditionally blur each pixel 902 of an image frame by means of performing arithmetic functions thereon, wherein said functions involve adding and/or subtracting and/or multiplying the respective RGBA values of a plurality of neighboring pixels, as shown at 903, 904. In effect, a kernel of pixels is defined based upon the number of said neighboring pixels upon which said functions are performed.

A problem of said averaging techniques according to the known prior art is that such kernels are not discriminating, whereby in regions of an image frame wherein neighboring pixels in close proximity have alternatively high and low frequencies (i.e. the RGBA values of which differ substantially), all of said pixels are blurred indiscriminately. This results in image frame artifacts, for instance because pixels 902, 904 in the grainy image that should be completely keyed-out have had their respective RGBA values averaged in relation to neighboring pixels, such as pixel 903, that will be completely keyed-in, whereby said averaged pixels 902, 904 will now be only partially keyed-out upon performing grain removal according to the known prior art at 905.

The present invention overcomes the respective limitations of both matte-based grain removal techniques and averaging grain removal techniques by providing a discriminating pixel kernel.

FIG. 10

Figure 10:
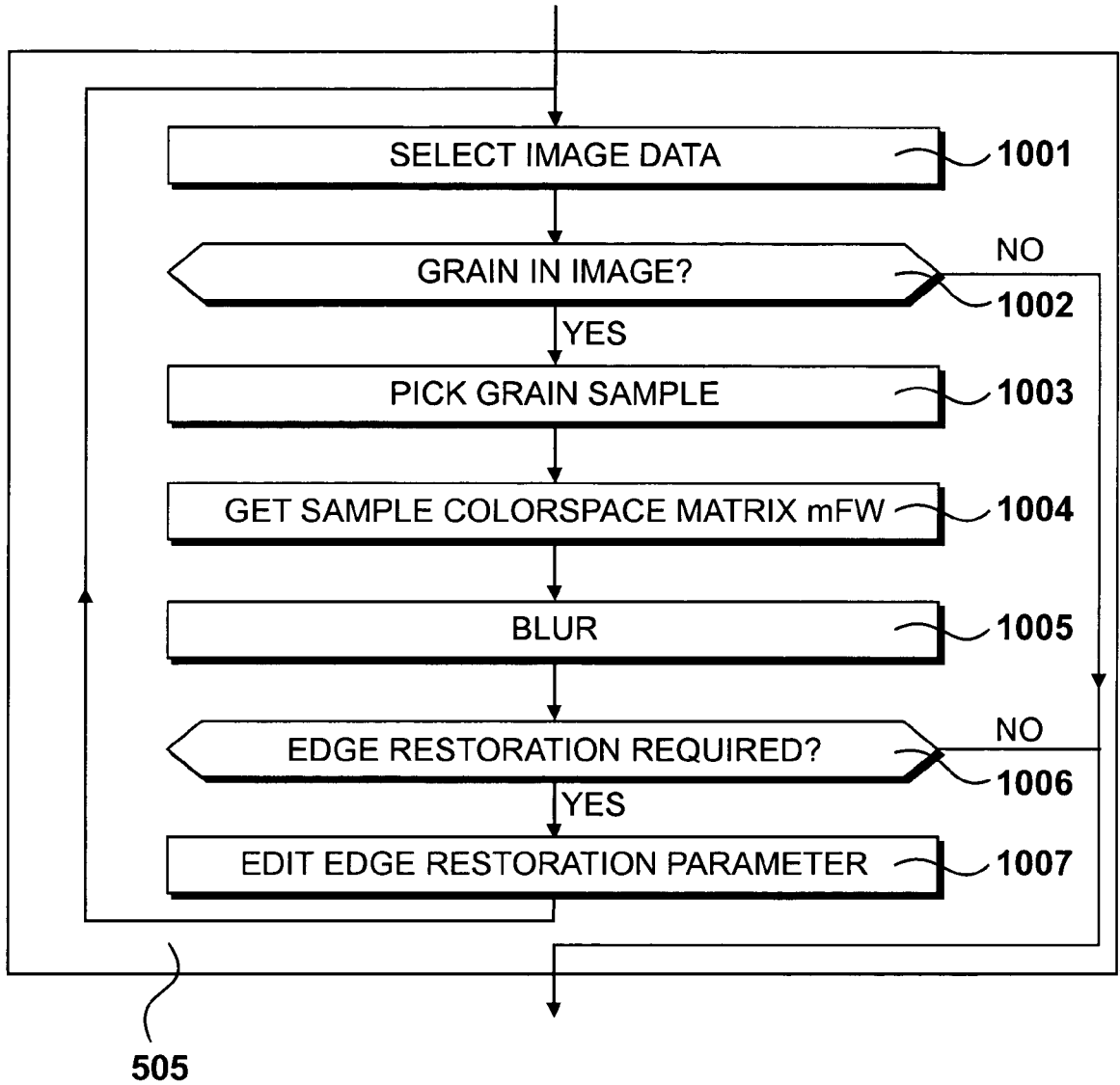
FIG. 10 further details the image data editing step shown in FIG. 5 according to which grain is removed from image data in a system configured according to the present invention, including a step of computing a bounding box-like volume and a step of blurring a pixel.

The operational step 505 according to which user 100 may edit image data in order to remove the grain thereof in a system configured according to the present invention is further detailed in FIG. 10.

At step 1001, user 100 selects image data which, according to the present description, is image data 607 containing grain 705. A first question is asked at step 1002 as to whether the image data 607 is grainy, e.g. wherein pixels or groups thereof have RGBA color component values substantially different from neighboring pixels in a portion of said image data wherein the respective RGBA values of all neighboring pixels should be substantially uniform, i.e. the blue or green background behind the TV presenter.

If the question of 1002 is answered negatively, application 602 may now render said image data at the next step 506. Alternatively, and in accordance with the example, said image data contains grain 705, whereby question 1002 is answered positively, such that user 100 may now select a grain sample at step 1003. In the preferred embodiment of the present invention, said sample selection involves user 100 positioning pointer 704 over a grainy portion of image frame 607, providing a first input such as a click of a button of mouse 107 or tapping stylus 102 on tablet 103, diagonally translating pointer 704 and providing a second input. Said sample thus comprises the pixels contained within a quadrilateral box, the size of which is computed from the respective position of pointer 704 at said first and second input.

At step 1004, a forward transformation matrix is calculated in order to compute a minimal box-like volume enclosing the respective representations of said selected pixels within a three-dimensional RGB color-space, wherein said representations are located with three-dimensional co-ordinates respectively derived from their red, green and blue color component values. At the next step 1005, each pixel of image frame 607 is blurred in proportion to the distance of its respective representation said RGB color-space, wherein said representation is again located with three-dimensional co-ordinates respectively derived from its red, green and blue color component values.

At step 1006, a second question is asked as to whether an edge restoration component of grain removal according to the present invention should be edited. In the preferred embodiment of the present invention, said edge restoration is a variable comprised between zero and one which allows user 100 to increase or decrease the degree of discriminance of the pixel kernel. If the question of 1006 is answered positively, said variable is edited, at step 1007, i.e. user 100 assigns a different value than the default value of 0.3 with which said pixels are blurred at said step 1005, whereby control is returned to step 1001. Alternatively, the question of 1006 is answered negatively, such that application 602 may now render image data 607 at the next step 506, wherein grain 705 has been removed according to the present invention.

FIG. 11

Figure 11:
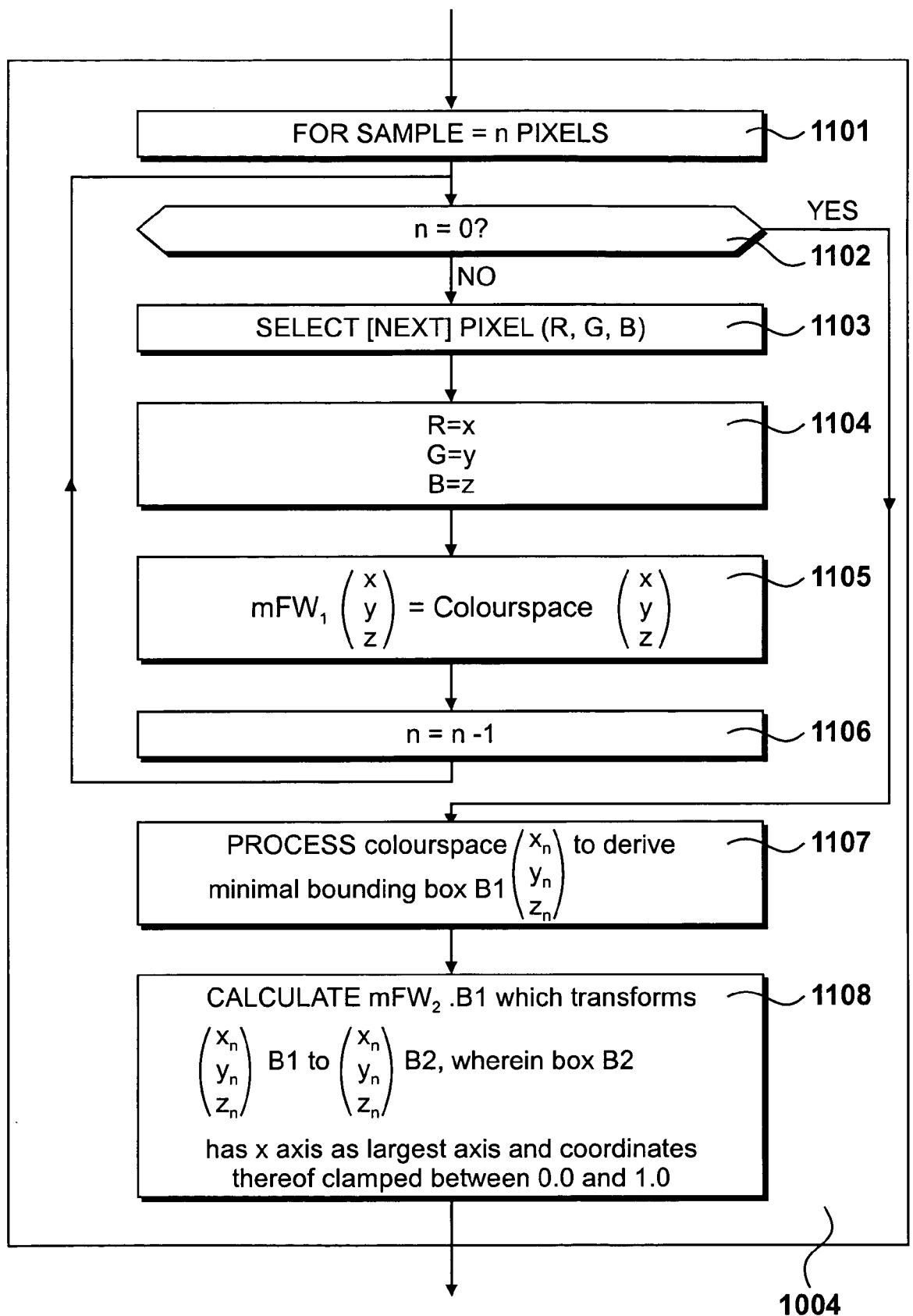
FIG. 11 further details the operational step of computing the bounding box-like volume shown in FIG. 10.

The step 1004 of computing the bounding box-like volume enclosing the respective representations of the sample pixels is further detailed in FIG. 11.

At step 1101, application 602 obtains the number of selected pixels of the sample by simply multiplying the length in pixels by the height in pixels of the quadrilateral box defined at step 1003. A question is asked at step 1102 as to whether the number of pixels obtained at step 1101 is equal to zero. If the question of step 1102 is answered negatively, application 602 selects the respective red, green and blue color component values of a first pixel in order to define said values as orthogonal co-ordinates X, Y and Z at the next step 1104. At step 1105, said orthogonal co-ordinates X, Y and Z are transformed within the three-dimensional RGB color-space by a first forward transformation matrix mFW1. At the next step 1106, the number of pixels obtained at step 1101 is decremented, whereby control is returned to 1102 and, upon processing all of the pixels in the sample according to steps 1103 to 1105, question 1102 is answered positively and control proceeds to the next step 1107.

At said step 1107, all of the selected pixels are now configured with respective three-dimensional color-space co-ordinates Xn, Yn and Zn, whereby a figurative "cloud" of which exists from which application 602 derives a minimal box-like volume B1, which is the smallest possible volume enclosing all of said color-space pixels. At the next step 1108, application 602 computes a second forward transformation matrix mFW2 which transforms the reference co-ordinate system defined by the volumetric centre of volume B1 into an alternative reference co-ordinate system, wherein the longest orthogonal axis corresponds to the Xn axis, whereby volume B1 is transformed into a volume B2. In effect, matrix mFW2 performs a three-dimensional transformation of volume B1, i.e. pixel color component values are multiplied by the concatenation of matrices mFW1 and mFW2. According to the preferred embodiment of the present invention, the distance between pixels located at each extremity or in close proximity thereof of the X axis of volume B2 represent the grain to be removed, i.e. said distance is the variable to be averaged.

FIG. 12

Figure 12:
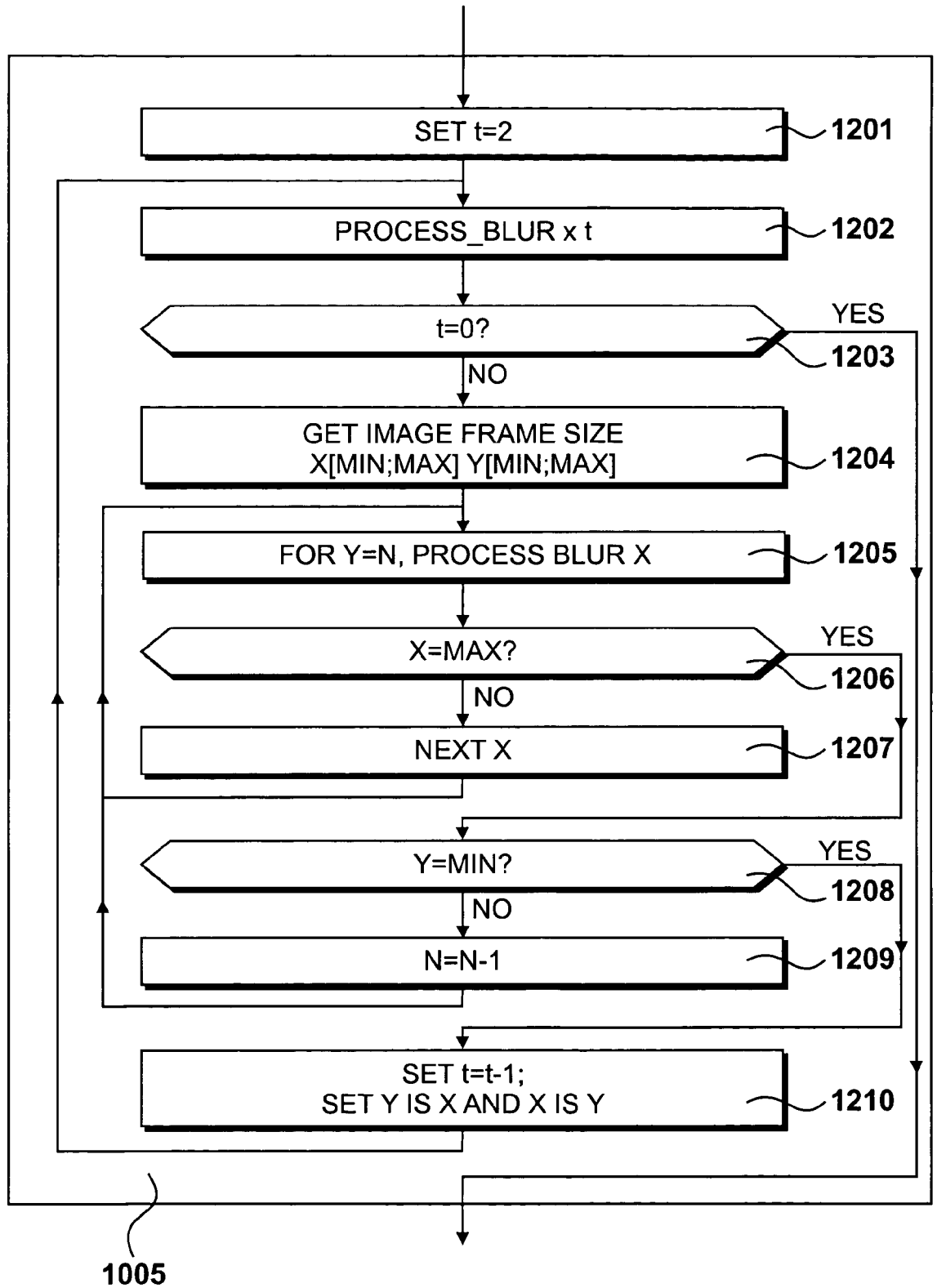
FIG. 12 further details the operational step of removing grain from the image data shown in FIGS. 3 to 7 and 10, including a step of blur processing a pixel.

The step 1005 of blurring each pixel of image frame 607 according to the present invention is further detailed in FIG. 12.

At step 1201, a frame processing counter t is initialized with a value of two. At the next step 1202, a processing condition is set, wherein the blur processing should be performed according to said t value. A first question is asked at step 1203 as to whether said t value is equal to zero.

If the question of step 1203 is answered negatively, application 602 derives the image frame size by obtaining the width of said image frame from its first (min) and last (max) pixel in a horizontal direction relative to the display of monitor 104, and the height of said image frame from its first (min) and last (max) pixel in a vertical direction relative to the display of monitor 104 at step 1204. At the next step 1205, a line counter n is declared and associated with the height obtained at step 1204 and application 602 blurs a first pixel according to the present invention.

A second question is asked at step 1206 as to whether said blurred pixel corresponds to the last (max) pixel or said line. If the question of step 1206 is answered negatively, application 602 selects the next pixel of said line at step 1207, whereby control is returned to question 1205. Upon processing a complete line of pixels of image frame 607 according to steps 1205 to 1207, the question of step 1206 is eventually answered positively, whereby a third question is asked at step 1208 as to whether said processed line corresponds to the last (min) line of said image frame. If the question of step 1208 is answered negatively, the line counter n is decremented at step 1209, whereby control is again returned to step 1205. Alternatively, if the question of step 1208 is answered positively, the frame processing counter t is decremented and the horizontal and vertical axes of frame 607 are swapped at step 1210. Said swapping of axes is preferred in the grain removal filter of the present invention in order to avoid artifacts that may result from a unidirectional processing of image data 607, wherein said filter is in effect a two-pass separable filter. Thus, control is subsequently returned to step 1202 wherein the blur processing is again performed according to steps 1203 to 1209 with said swapped axes and, upon performing processing step 1210 a second time, the question of step 1203 is answered positively and the grain 705 in image frame 607 has been removed.

FIG. 13

Figure 13:
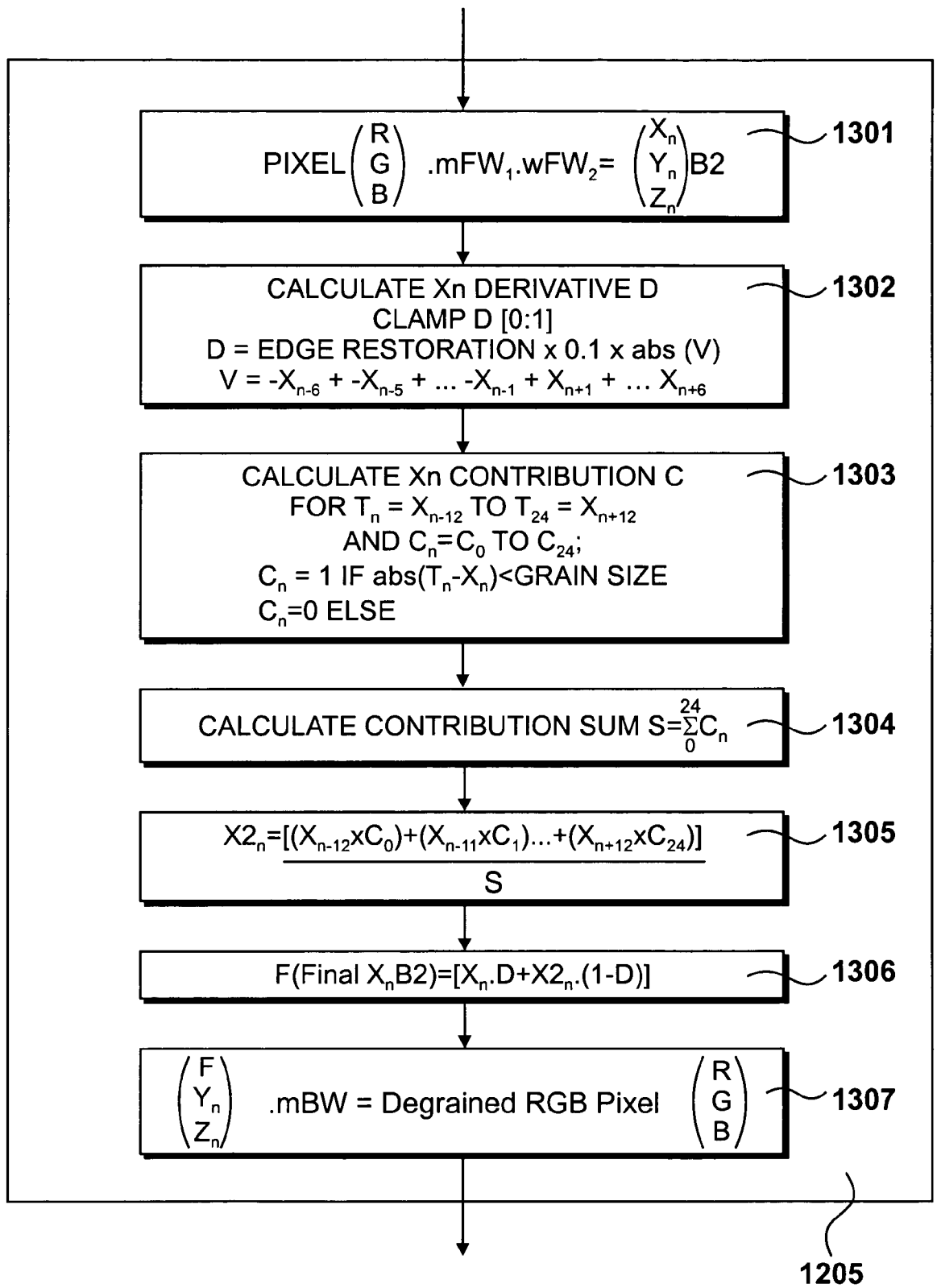
FIG. 13 further details the operational step of blur processing a pixel shown in FIG. 12.

The processing step 1205 of blur processing each pixel of image frame 607 is further detailed in FIG. 13.

At step 1301, the respective red, green and blue color component values of an image frame pixel are transformed into Xn, Yn and Zn orthogonal co-ordinates in the reference co-ordinate system of volume B2 according to the concatenation of matrix mFW1 and mFW2.

At step 1302, the derivative D of Xn is clamped to a value between zero and one and subsequently processed as the multiplication of the edge restoration variable (which is 0.3 by default and ranges between zero and one) by a factor of 0.1 and by an absolute value V, which is the sum of the respective inverse of the Xn value of the six pixels to the left of the currently processed pixel in the line added to the sum of the six pixels to the right of said currently processed pixel as a consequence, if the original pixel X defines an edge that should be keyed-in, the resulting V value will be high and, conversely, if said original pixel defines the background that should be keyed-out the resulting V value will be constant or low, and possibly equal to zero.

At step 1303, a contribution factor C is processed for the pixel currently processed, which is based upon a twenty-five-wide pixel kernel having said currently processed pixel as its center, thus wherein twenty-five values are calculated. Said contribution factor C is the value from which a second X2n value will be generated with which to average the above Xn value. Accordingly, a range of twenty five kernel values T zero to T twenty-four and a floating contribution factor Cn are declared, wherein said floating contribution factor Cn is assigned for each kernel position a value of one if the absolute value of the kernel value minus the Xn value is inferior to the grain size and a value of zero otherwise. Step 1303 effectively performs a pixel discrimination between high color-frequency pixels (Cn=0) and low color-frequency pixels (Cn=1). At step 1304, the sum total S of the twenty five contribution values generated at step 1303 is calculated, whereby said X2n value is calculated at the next step 1305 as the sum total of the twenty-five Xn values, each of which being multiplied by its respective contribution Cn, divided by said sum total S.

At step 1306, the final FXn co-ordinate within volume B2 of the pixel currently processed, i.e. the final location of said pixel relative to the reference co-ordinate system defined by transformation matrices mFW1, mFW2 corresponding to the averaged original Xn location is equal to the sum of the Xn value multiplied by its derivative D and the corresponding X2n value multiplied by the inverse of said derivative. At step 1307, said FXn co-ordinate and the partially transformed Y and Z co-ordinates of the pixel are multiplied by the inverse transformation matrix mBW of the mFW1, mFW2 concatenation in order to return an averaged RGB pixel.

FIG. 14

Figure 14:
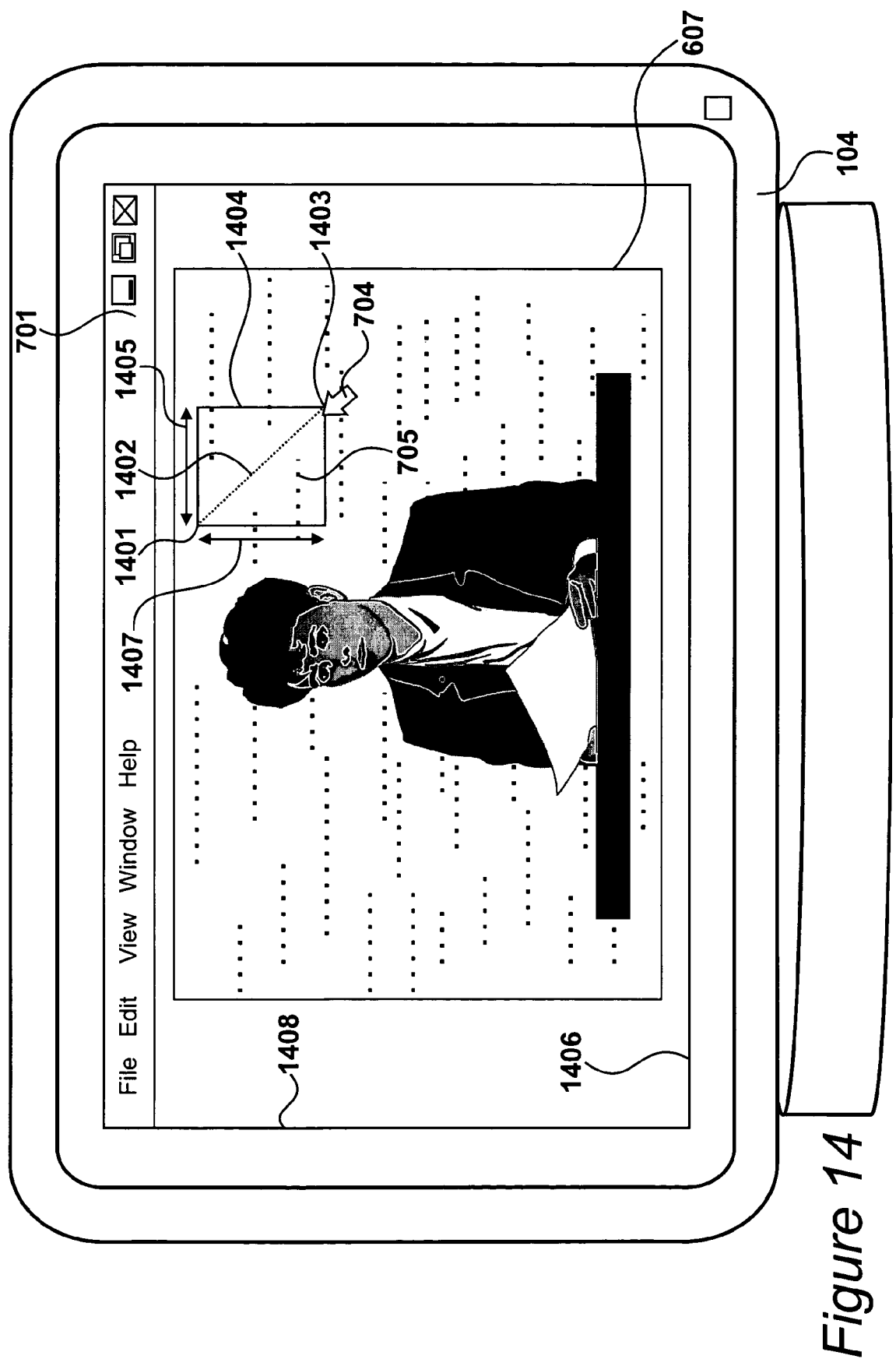
FIG. 14 shows the graphical user interface shown in FIG. 7, wherein a sample is taken of the grain in the image data.

The graphical user interface 701 of application 602 is shown in FIG. 14, wherein a sample is taken of the grain in an image frame.

GUI 701 is again shown as displayed on monitor 104 wherein the image frame 607 includes grain 705, as described in FIG. 7. According to the present description, user 100 preferably effects a mouse click or taps stylus 102 onto tablet 103 with cursor 704 located at screen position 1401. User 100 subsequently drags said pointer 704 along a substantially diagonal axis 1402 over to a screen position 1403 and effects another mouse click or another stylus tap. In an alternative embodiment of the present invention, user 100 maintains pressure upon the mouse button clicked at screen position 1401, or upon the tablet 103 by means of stylus 102, until translating pointer 704 therewith to screen position 1403, then releases said button or stylus, having thus performed a "dragging" logical operation.

A grain sample 1404 is thus obtained according to step 1003, having a width 1405 processed by application 602 as the horizontal distance along the X axis 1406 of GUI 701 between screen positions 1401 and 1403 and a height 1407 processed by application 602 as the vertical distance along the Y axis 1408 of GUI 701 between said screen positions 1401 and 1403.

FIG. 15

The graphical user interface 701 of application 602 is shown in FIG. 15, wherein grain is removed from the image data 607 shown therein in FIG. 14.

GUI 701 is again shown as displayed on monitor 104 wherein grain 705, a sample 1404 of which was selected according to step 1003 illustrated in FIG. 14, has been removed from the image frame 607.

According to the present invention and in accordance with the present description, upon selecting sample 1404, matrices mFW1 and mFW2 were calculated according to steps 1101 to 1108, whereby each pixel of image frame 607 was first processed according to a grain-removal filtering pass following a direction 1501, then again processed according to a second grain-removal filtering pass following a direction 1502.

The grain 705 of image frame 607 is therefore uniformly removed from the blue or green background and the TV presenter in the frame, but grain removal from said TV presenter is marginal since the respective RGB values of the pixels thereof lie outside the RGB values of the sampled pixels, which form the basis for estimating the required amount of averaging. The edges defined by the hair 803 are preserved, i.e. neighboring pixels 902 are not averaged into artifact-prone pixels as described in FIG. 9, because pixels 803 are not taken into consideration (by way of the contribution factor C defining X2n) when averaging blue or green screen pixels 902, 904. Indeed, the pixel kernel of the preferred embodiment of the present invention has the effect of a discriminating kernel wherein the integrity of high frequency pixels is preserved during the blurring process.

The invention claimed is:

1. Apparatus for removing grain from image data, comprising processing means, memory means, display means and manually operable input means, wherein said memory means stores said image data and instructions, said image data and said instructions configure said processing means to perform the steps of:

displaying said image data as picture screen elements on said display means;

selecting a first sample of said picture screen elements by means of said input means;

selecting a grain sample within said first sample;

transforming pixels within said grain sample into respective color space representations; and blur processing each pixel of said grain sample using proportional averaging based on a distance within said color space representation, wherein during said blurring, an integrity of high color frequency pixels is presented by using a contribution factor that discriminates between high color frequency pixels and low color frequency pixels.

2. The apparatus of claim 1 wherein said transforming is performed using a first forward transformation matrix, said method further comprising:

computing a minimal volume that encloses all of said color space representations of said pixels within said grain sample.

3. The apparatus of claim 2, wherein said transforming further comprises using a second forward transformation matrix that transforms a reference coordinate system of said respective color space representations into an alternative reference coordinate system, wherein a distance between pixels located proximate to an x-axis of the alternative reference coordinate system represent grain to be removed.

4. The apparatus of claim 1 wherein said blur processing is performed in two directions.

5. The apparatus of claim 1 wherein:

said contribution factor is based upon a twenty-five-wide pixel kernel having a currently processed pixel as its center; and said contribution factor is assigned for each kernel position a value of one if an absolute value of a kernel value minus a pixel distance value is inferior to a grain size and a value of zero otherwise; and all of the assigned contribution factors are averaged during the blur processing.

6. A method of removing grain from image data, said method comprising the steps of:

displaying image data as picture screen elements on display means;

selecting a first sample of said picture screen elements by means of manually-operable input means;

selecting a grain sample within said first sample;

transforming pixels within said grain sample into respective color space representations; and blur processing each pixel of said grain sample using proportional averaging based on a distance within said color space representations, wherein during said blurring, an integrity of high color frequency pixels is preserved by using a contribution factor that discriminates between high color frequency pixels and low color frequency pixels.

7. The method of claim 6 wherein said transforming is performed using a first forward transformation matrix, said method further comprising:
computing a minimal volume that encloses all of said color space representations of said pixels within said grain sample.

8. The method of claim 7, wherein said transforming further comprises using a second forward transformation matrix that transforms a reference coordinate system of said respective color space representations into an alternative reference coordinate system, wherein a distance between pixels located proximate to an x-axis of the alternative reference coordinate system represent grain to be removed.

9. The method of claim 6 wherein said blur processing is performed in two directions.

10. The method of claim 6 wherein:
said contribution factor is based upon a twenty-five-wide pixel kernel having a currently processed pixel as its center; and
said contribution factor is assigned for each kernel position a value of one if an absolute value of a kernel value minus a pixel distance value is inferior to a grain size and a value of zero otherwise; and
all of the assigned contribution factors are averaged during the blur processing.

11. A computer-readable medium having computer-readable instructions for removing grain from image data executable by a computer such that, when executing said instructions, said computer will perform the steps of:
displaying said image data as picture screen elements on display means;
selecting a first sample of said picture screen elements by means of manually-operable input means
selecting a grain sample within said first sample;
transforming pixels within said grain sample into respective color space representations; and
blur processing each pixel of said grain sample using proportional averaging based on a distance within said color space representation, wherein during said blurring, an integrity of high color frequency pixels is preserved by using a contribution factor that discriminates between high color frequency pixels and low color frequency pixels.

12. The computer-readable medium of claim 11 wherein said transforming is performed using a first forward transformation matrix, said method further comprising:
computing a minimal volume that encloses all of said color space representations of said pixels within said grain sample.

13. The computer-readable medium of claim 12, wherein said transforming further comprises using a second forward transformation matrix that transforms a reference coordinate system of said respective color space representations into an alternative reference coordinate system, wherein a distance between pixels located proximate to an x-axis of the alternative reference coordinate system represent grain to be removed.

14. The computer-readable medium of claim 11 wherein said blur processing is performed in two directions.

15. The computer-readable medium of claim 11 wherein:
said contribution factor is based upon a twenty-five-wide pixel kernel having a currently processed pixel as its center; and
said contribution factor is assigned for each kernel position a value of one if an absolute value of a kernel value minus a pixel distance value is inferior to a grain size and a value of zero otherwise; and
all of the assigned contribution factors are averaged during the blur processing.

* * * * *